United States Patent [19]

Bartmann

[11] Patent Number: 4,720,538

[45] Date of Patent: Jan. 19, 1988

[54] PREPARATION OF AROMATIC POLYAMIDE WITH PHOSPHORUS CONTAINING CATALYST AND DIALKYLAMINO PYRIDINE COCATALYST.

[75] Inventor: Martin Bartmann, Recklinghausen, Fed. Rep. of Germany

[73] Assignee: Huls Aktiengesellschaft, Marl, Fed. Rep. of Germany

[21] Appl. No.: 888,729

[22] Filed: Jul. 24, 1986

[30] Foreign Application Priority Data

Jul. 25, 1985 [DE] Fed. Rep. of Germany ....... 3526622

[51] Int. Cl.$^4$ .............................................. C08G 69/28
[52] U.S. Cl. .................................. 528/336; 528/179; 528/182; 528/183; 528/193; 528/207; 528/208; 528/210; 528/211; 528/223; 528/224; 528/229; 528/337

[58] Field of Search ............... 528/336, 337, 179, 182, 528/183, 193, 207, 208, 210, 211, 223, 224, 229

[56] References Cited

U.S. PATENT DOCUMENTS

| | | | |
|---|---|---|---|
| 3,932,364 | 1/1976 | Yamazaki et al. | 528/336 |
| 4,045,417 | 8/1977 | Yamazaki et al. | 528/336 |
| 4,118,374 | 10/1978 | Yamazaki et al. | 528/336 |
| 4,598,143 | 7/1986 | Heitz et al. | 528/336 |

*Primary Examiner*—Harold D. Anderson
*Attorney, Agent, or Firm*—Oblon, Fisher, Spivak, McClelland & Maier

[57] ABSTRACT

A method of manufacturing polyamides from aromatic dicarboxylic acids and aromatic diamines in the presence of catalytic amounts of a phosphorous-containing catalyst and a 4-diakylaminopyridine as cocatalyst, at temperatures above 180° C., is described.

13 Claims, No Drawings

PREPARATION OF AROMATIC POLYAMIDE WITH PHOSPHORUS CONTAINING CATALYST AND DIALKYLAMINO PYRIDINE COCATALYST.

BACKGROUND OF THE INVENTION

1. Field of the Invention

The present invention relates to aromatic polyamides and to methods for their manufacture.

2. Description of the Background

Aromatic polyamides are distinguished by their high temperature stability and good mechanical properties. They are particularly used for the manufacture of fibers and films (see Elias and Vohminkel, "New polymeric materials for industrial use" [in German], 2nd Ed, Carl Hanser Verlag, 1983, pp. 242 ff.).

Some known methods of preparing aromatic polyamides are outlined below.

1. Low temperature solution polycondensation; reacting aromatic dicarboxylic acid dichlorides with aromatic diamines, in polar solvents (cf. U.S. Pat. Nos. 3,287,324, 3,541,056, 3,600,350, 3,819,587, 3,767,756, 3,869,429, 3,673,143, 3,817,941, and 3,063,966, and German AS No. 22 19 703).

2. Interface polycondensation; reaction of an aromatic dicarboxylic acid dichloride and an aromatic diamine at the interface of an organic and aqueous phase (cf. German OS Nos. 19 08 297 and 23 25 139, and German Pat. No. 30 06 899).

Aromatic polyamides can also be prepared by reacting aromatic dicarboxylic acids with aromatic diisocyanates (German OS No. 19 28 435), and by reacting aromatic dicarboxylic acid diaryl esters with aromatic diamines.

All these methods however have the disadvantage that they depend on the use of activated, difficult to handle monomers, such as, e.g., dicarboxylic acid chlorides, aromatic diisocyanates, or aromatic dicarboxylic acid diaryl esters.

Some methods are also known in which aromatic polyamides are obtained directly by the reaction of aromatic dicarboxylic acids with aromatic diamines in the presence of aromatic phosphites. Solvents which have proved effective for this method are N-methylamides, particularly N-methylpyrrolidone (NMP). When, however, other apolar, aprotic solvents such as, e.g., dimethyl sulfoxide are used no polymeric amides are obtained (see F. Higashi et al., 1980, *J. Polym. Sci., Polym. Chem. Ed.*, 18: 1711 ff.).

A review article by S. M. Aharoni et al. (*J. Polym. Sci., Polym., Chem. Ed.*, 1984, 22: 2579) summarizes the state of the art as follows.

(1) The molecular weight of a polyamide can be increased by the addition of lithium chloride or calcium chloride.

(2) If a phosphite is employed in the condensation of aromatic dicarboxylic acids and aromatic diamines (a) it must contain aryl groups. Preferably the phosphite is triphenyl phosphite. (b) The phosphite must be used in at least an amount such that for each 1 mol of the amine being reacted there is present 1 mol of a compound with the group

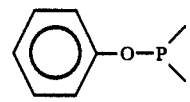

This group is consumed in the course of the reaction and is the driving force for the conversion. (c) The optimal temperature range for carrying out this reaction is 80°–100° C., while at temperatures appreciably above 100° C. the molecular weight greatly decreases. And (d) pyridine, while not necessary for the reaction, has an accelerating effect on the course of the reaction.

European OS No. 0 099 997, describes a method for preparing aromatic polyamides. In this method aromatic dicarboxylic acids are reacted with aromatic diamines in a polar solvent in the presence of a dehydrating catalyst such as. e.g., a phosphorus-containing compound, such as triphenyl phosphite, phosphorous acid, or triethyl phosphate. Our tests have shown that satisfactory results are not obtained either with triphenyl phosphite or with a phosphorus-containing acid, such as hypophosphorous acid, as catalyst, and sulfolane as solvent. The products, which are obtained after 3 to 12 hours, are of poor color quality. If one employs electron-rich aromatic diamines such as e.g., 4,4'-diaminodiphenyl ether, high molecular weight products are obtained only after long reaction times. And these products are strongly colored due to the formation of unidentified by-products. On the other hand, if one employs electron-poor diamines such as, e.g. 4,4'-diaminodiphenylsulfone, the method of European OS No. 0 099 997 is completely unsuitable. The only products which can be produced are strongly colored oligomers.

The state of the art shows that the preparation of high molecular weight aromatic polyamides depends on a number of variant parameters whose effects are not predictable. The widely diverging reaction conditions render it unlikely that one skilled in this art would expect the method of European OS No. 0 099 997 to be successfully combinable with the above-described method of *J. Polymer Sci*. The known art would indicate that it does not seem possible to obtain high molecular weight polyamides of good color quality by reacting aromatic diamines with aromatic dicarboxylic acids.

There is thus a strongly felt need for a method for preparing aromatic polyamides which does not suffer the disadvantages outlined above. Such a method, for example, would ideally not depend on the use of activated, difficult to handle monomers. And such a method would produce high quality aromatic polyamide products in high yields.

SUMMARY OF THE INVENTION

Accordingly it is an object of this invention to provide a process for preparing aromatic polyamides which does not depend on the use of activated, difficult to handle monomers.

It is another object of this invention to provide a process for obtaining high molecular weight aromatic polyamides.

It is another object of this invention to provide a process to obtain aromatic polyamides by the direct polycondensation of an aromatic diamine with an aromatic dicarboxylic acid.

It is another object of this invention to obtain aromatic polyamides having good color quality.

It is another object of this invention to provide a process to obtain aromatic polyamides in good yields.

It is another object of this invention to provide a process to obtain aromatic polyamides in which the polycondensation time is greatly reduced.

The present invention relates to the inventor's surprising discovery of a novel process for obtaining aromatic polyamides which satisfies all of the above objects of this invention and other objects which will become apparent from the description given hereinbelow. In this process approximately equimolar amounts of an aromatic dicarboxylic acid and an aromatic diamine are reacted in the presence of a catalytically effective amount of a phosphorous compound and a 4-dialkylaminopyridine. The reaction is run in a polar aprotic solvent, at temperatures above 180° C.

DETAILED DESCRIPTION OF THE PRESENT INVENTION

Considering the fact that according to the data of S. M. Aharoni et al., stoichiometric amounts of a phosphorous compound are needed for preparing aromatic polyamides, it is surprising that with the present invention catalytic amounts are sufficient not only to initiate the reaction but also also provide substantially better products. Furthermore, Comparison Example D shows that even stoichiometric amounts of quinoline yield completely unsatisfactory results.

Comparison of the method of this invention with the one of European OS No. 0 099 997 (compare Examples A with 2; B with 3; and C with 4) demonstrates that the addition of small amounts of 4-dialkylaminopyridine has a significant effect on the polyamide that is formed.

(1) The J-value, which is a measure of molecular weight, is substantially increased.
(2) The color quality is greatly improved.
(3) The polycondensation time is drastically reduced.
(4) The yield is improved.

In this invention any of the known aromatic dicarboxylic acids, or their mixtures, recognized to be useful for polycondensation with aromatic diamines may be used. In particular the following aromatic dicarboxylic acids, or mixtures thereof, may be employed:

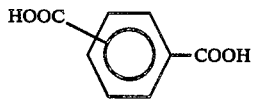

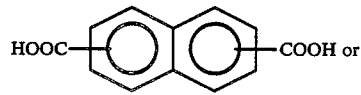

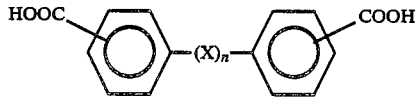

X is —O—, —S—, —CO—, —CH$_2$—, or —SO$_2$—. n is zero or one.

Preferred dicarboxylic acids are: terephthalic acid, isophthalic acid, 2,6-naphthalenedicarboxylic acid, 4,4-biphenyldicarboxylic acid, 4,4'-diphenyl ether dicarboxylic acid, 4,4'-benzophenonedicarboxylic acid, and 4,4'-diphenyl sulfone dicarboxylic acid.

Up to 40 mol% of these aromatic dicarboxylic acids may be replaced by the following acids:

Aliphatic dicarboxylic acids or their anhyrides containing 2-10 carbon atoms.

Aliphatic oligoamides with terminal COOH groups which are obtained be reacting aliphatic dicarboxylic acids having 2-10 carbon atoms with lactams or polyalkylene polyamines having up to 5 amino groups and up to 10 carbon atoms.

Aromatic tri- and tetracarboxylic acids or their anhydrides containing 9-22 carbon atoms.

Some specific examples are given below.

Maleic anhydride.

An oligoamide obtained by the reaction of 5 moles of ethylenediamine with 6 moles of a hexanedicarboxylic acid of the formula:

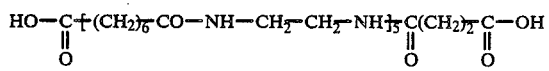

An oligoamide obtained by the reaction of 10 mol lauryl lactam with 1 mol dodecanedicarboxylic acid.

Trimellitic acid anhydride and pyromellitic acid anhydride.

As the aromatic diamines or their mixtures useful in the present invention those recognized in the art to be suitable for polycondensation with aromatic dicarboxylic acids may be employed. In particular the following aromatic diamines, or other mixtures, may be used:

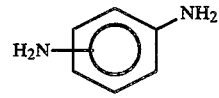

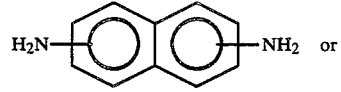

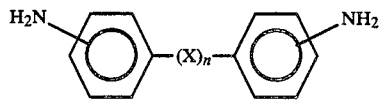

Here, X and n have the same meanings as given above in the characterization of the aromatic dicarboxylic acids.

Preferred aromatic diamines are: p-phenylenediamine, m-phenylenediamine, 4,4'-diaminodiphenylmethane, 4,4'-diaminodiphenyl ether, 3,4'-diaminodiphenyl ether, 4,4'-diaminodiphenyl sulfide, and 4,4'-diaminodiphenyl sulfone.

Up to 40 mol% of these aromatic diamines may be replaced by the following amines:

Aliphatic di- and polyamines containing 2-10C atoms; and

Aliphatic oligoamides with terminal NH$_2$ groups which are obtained by reacting these aforementioned di- and/or polyamines with lactams or with aliphatic di- and/or polycarboxylic acids.

The following are examples of the amines which may replace up to 40 mol% of the aromatic diamines: 1,12-Dodecanediamine, an "oliogoamide-12-diamine" prepared by reacting 10 mol lauryl lactam with 1 mol 1,6-hexanediamine.

Any of the phosphorous compounds known to be catalytically effective may be used. In particular PR$_3$, HPR$_2$, phosphoric acid, hypophosphorous acid, as well as the anhydrides P$_2$O$_5$ and P$_2$O$_3$ are suitable. R is a halogen atom (such as chlorine or bromine), a OH group, a OAr group (where Ar is phenyl or alkyl substituted phenyl) or an alkoxy group with 1-10 carbon atoms.

Exemplifying such phosphorous compounds are: Phosphoric acid, phosphorus pentoxide, triphenyl phosphite, phosporous acid and hypophosphorous acid. Preferred are triphenyl phosphite and hypophosphorous acid.

The 4-diakylaminopyridines used as co-catalysts have the following structure:

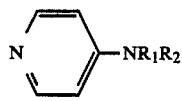

wherein R$_1$ and R$_2$, independently, each is an alkyl group with 1 to 10 carbon atoms; or R$_1$ and R$_2$ together with the amino nitrogen form a pyrrolidine or piperidine ring.

Preferred 4-dialkylaminopyridines are: 4-dimethylaminopyridine, 4-dibutylaminopyridine, 4-di-n-hexylaminopyridine, and 4-piperidinylpyridine.

The pyridine derivatives may be prepared according to *Synthesis*, 844 (1978).

The phosphorous compound and the 4-dialkylaminopyridine each are employed in an amount of 0.1 to 10 mol, preferably 1 to 5 mol based on 100 mol dicarboxylic acid reacted. The polycondensation is carried out between 180° and 300° C., preferably between 100° and 260° C.

Usually, the condensation is carried out in an inert gas atmosphere at normal pressure. However, if desired, a slightly lower or higher pressure may be employed. In general, rection times between 1 and 4 hours are needed to yield products of sufficiently high molecular weight. Substantially longer times may be required with less reactive reactants.

The preferred reaction medium comprises polar, aprotic, organic solvents capable of adequately dissolving the starting products as well as the polymeric amides at at least 180° C. Examples of suitable solvents are: N-methyl-2-pyrrolidone (NMP), N-methyl-3-caprolactam, N,N-dimethylacetamide, dimethyl sulfoxide, sulfolane, and diphenyl sulfone. These solvents may be used singly or as mixtures. Examples of other solvents, usable in combination with the abovementioned polar aprotic solvents, are: chlorobenzene, dichlorobenzene, nitrobenzene, diphenyl ether, methoxybenzene, phenol, and m-cresol. The proportion of the aprotic polar solvents in these mixtures should be at least 20 wt.%. The preferred aprotic polar solvent is sulfolane.

A preferred reaction procedure is outlined below.

The solution comprising approximately equimolar amounts of aromatic dicarboxylic acid and aromatic diamine, in the presence of the phosphorous compound and the 4-dialkylaminopyridine, with a solids concentration of 5-50 wt.%, is heated in an inert gas atmosphere to a temperature between 200° and 260° C. This temperature is maintained for about 1-3 hour. The polyamide is then isolated by conventional techniques.

To produce sufficiently high molecular weight products it is necessary to remove the water formed during the polycondensation from the reaction system. Ordinarily, passing an inert gas through or over the reaction mixture will be sufficient for this purpose. However, a vacuum may also be applied, and/or part of the solvent may be removed along with the water by means of azeotropic distillation.

At the end of the polycondensation, a more or less viscous solution, or a suspension of the polymers, in the solvent employed is obtained. The aromatic polyamides from this solution or suspension may either further be processed directly, or isolated by known techniques, such as being precipitated out, following dilution, by addition of an "antisolvent". Antisolvents that may be used include lower alcohols, e.g., methanol, ethanol, and isopropanol; ketones, e.g., acetone and methyl ethyl ketone; or water; or mixtures of these.

Other features of the invention will become apparent in the course of the following descriptions of exemplary embodiments which are given for illustration of the invention and are not intended to be limiting thereof.

EXAMPLE 1

Starting materials:
16.60 g (0.1 mol) isophthalic acid.
20.33 g (0.1025 mol) 4,4'-diaminodiphenylmethane.
0.54 g H$_3$PO$_2$ (50 wt. % aqueous solution).
0.46 g 4-dimethylaminopyridine.
60 ml sulfolane.

Procedure: The starting materials are charged into a stirred apparatus, freed of traces of oxygen by evacuating the apparatus 5 times, followed each time by admission of nitrogen. The mixture is then intensively stirred to homogenize it, nitrogen as scavenging agent is introduced at a rate of 100 liter/hr and the temperature is maintained at 130° C. The temperature is then raised to 230° C. over a period of 60 minutes. After a polycondensation time of 200 min, the mixture, which becomes very viscous, is diluted with 100 ml sulfolane, cooled to 160° C., and further diluted with 200 ml dimethylformamide. The resulting clear solution is cooled and then poured under stirring into 1.5 liters water. The resulting fine precipitate is suction-filtered and washed two times with water and two times with acetone, and the product dried at 100° C. under vacuum by using an oil vacuum pump.

Yield: 32 g.
Polycondensation time: 200 min, at 230° C.
J-value: 174 cm$^3$/g (measured as a 0.5 wt. % solution in sulfuric acid, at room temperature).
Color: white.

The IR spectrum confirms an aromatic polyamide structure.

EXAMPLE 2

Starting materials:
16.60 g (0.1 mol) isophthalic acid.
20.33 g (0.1025 mol) 4,4'-diaminodiphenylmethane.
1.05 g triphenyl phosphite.
0.46 g 4-dimethylaminopyridine.
60 ml sulfolane.

The polycondensation was carried out in the same manner as in Example 1.

Yield: 31.5 g.
Polycondensation time: 150 min at 230° C.
J-value: 160 cm$^3$/g (measured as a 0.5 wt % solution in sulfuric acid, at room temperature).

The IR spectrum confirms an aromatic polyamide structure.

EXAMPLE 3

Starting materials:
16.60 g (0.1. mol) isophthalic acid
20.60 g (0.103 mol) 4,4′-diaminodiphenyl ether.
0.54 g $H_3PO_2$ (50 wt % aqueous solution).
0.46 g 4-dimethylaminopyridine.
60 ml sulfolane.

The polycondensation was carried out in the same manner as in Example 1.

Yield: 32 g.
Polycondensation time: 120 min at 230° C.
J-value: 54 cm$^3$/g (measured as a 0.5 wt % solution in N-methylpyrrolidone-2 at room temperature).
Color: almost white.

The IR spectrum confirms ether groups as well as an aromatic polyamide structure.

EXAMPLE 4

Starting materials:
16.60 g (0.1 mol) isophthalic acid.
24.83 g (0.1 mol) 4,4′-diaminodiphenyl sulfone.
1.05 g triphenyl phosphite.
0.60 g 4-dibutylaminopyridine.
60 ml sulfolane.

The polycondensation was carried out in the same manner as in Example 1.

Yield: 35.5 g.
Polycondensation time: 180 min at 230° C., 360 min at 250° C.
J-value: 35 cm$^3$/g (measured as a 0.5 wt % solution in N-methylpyrrolidone-2, at room temperature).
Color: white.

The IR spectrum confirms sulfone groups as well as an aromatic polyamide structure.

EXAMPLE 5

Starting materials:
16.60 g (0.1 mol) terephthalic acid.
20.33 g (0.1025 mol) 4,4′-diaminodiphenylmethane.
1.05 g triphenyl phosphite.
0.46 g 4-dimethylaminopyridine.
60 ml sulfolane.

The polycondensation is carried out in the same manner as in Example 1, except that 50 ml doses of sulfolane are further added to the reaction mixture during the polycondensation phase after 60, 120, and 180 min. The reaction product is isolated by precipitation with a solvent mixture of methanol and water in the ratio 1:1 by volume.

Yield: 31 g.
Polycondensation time: 60 min at 230° C., 150 min at 250° C.
J-value: 78 cm$^3$/g (measured as a 0.5 wt % solution in sulfuric acid, at room temperature).

EXAMPLE 6

Starting materials:
8.30 g (0.05 mol) isophthalic acid.
8.30 g (0.05 mol) terephthalic acid.
20.33 g (0.1025 mol) 4,4′-diaminodiphenylmethane.
1.05 g triphenyl phosphite.
0.48 g 4-dimethylaminopyridin
60 ml sulfolane.

The polycondensation is carried out in the same manner as in Example 1, except that 50 ml sulfolane is further added to the reaction mixture after 90 min of polycondensation. The reaction product is isolated by precipitation with a solvent mixture of methanol and water in the ratio 1:1 by volume.

Yield: 31 g.
Polycondensation time: 60 min at 230° C., 30 min at 250° C.
J-value: 187 cm$^3$/g (measured as a 0.5 wt % solution in sulfuric acid, at room temperature).

EXAMPLE 7

Starting materials:
16.60 g (0.1 mol) isophthalic acid.
10.16 g 4,4′-diaminodiphenylmethane.
12.73 g 4,4′-diaminodiphenyl sulfone.
1.20 g of triphenyl phosphite.
0.48 g 4-dimethylaminopyridine.
60 ml sulfolane.

The polycondensation is carried out in the same manner as in Example 1, except that the reaction product is isolated by precipitation with a solvent mixture of methanol and water in the ratio 1:1 by volume.

Yield: 33 g.
J-value: 118 cm$^3$/g (measured as a 0.5 wt % solution in N-methylpyrrolidone-2, at room temperature).

EXAMPLE 8

Starting materials:
16.60 g (0.1 mol) isophthalic acid.
20.33 g (0.1025 mol) 4,4′-diaminodiphenylmethane.
0.54 g $H_3PO_2$ (50 wt % aqueous solution).
0.46 g 4-dimethylaminopyridine.
60 ml of diphenyl sulfone.

The polycondensation is carried out in the same manner as in Example 1, except that the polyamide is isolated by pouring the reaction product into methanol and them extracting the polyamide precipitate with boiling hot acetone.

Yield: 30 g.
J-value: 112 cm$^3$/g (measured as a 0.5 wt. % solution in N-methylpyrrolidone-2, at room temperature).

EXAMPLE 9

Starting materials:
20.2 g (0.1 mol) 4,4′-diaminodiphenyl ether.
8.4 g (0.05 mol) isophthalic acid.
10.8 g (0.05 mol) 1,4-naphthalenedicarboxylic acid.
0.54 g $H_3PO_2$ (50 wt. % aqueous solution).
0.46 g 4-dimethylaminopyridine.
60 ml sulfolane.

The polycondensation is carried out in the same manner as in Example 1. The reaction product is isolated by precipitation with a solvent mixture of methanol and water in the ratio 1:1 by volume.

Yield: 34.1 g.
Polycondensation time: 60 min at 230° C., 120 min at 250° C.
J-value: 67 cm$^3$/g (measured as a 0.5 wt. % solution in N-methylpyrrolidone-2, at room temperature).

EXAMPLE 10

Starting materials:
5.13 g (30.9 mmol) isophthalic acid.
8.17 g (41.2 mmol) 4,4′-diaminodiphenylmethane.
21.7 g (10.9 mmol) "oligoamide-12-dicarboxylic acid" (Mn=2000)
0.54 g $H_3PO_2$ (50 wt.% aqueous solution).
0.46 g 4-dimethylaminopyridine.

85 ml sulfolane.

Procedure: Isophthalic acid and 4,4'-diaminodiphenylmethane are precondensed in the presence of the catalyst, in 25 ml sulfolane, for 120 min at 250° C. Then the "oligoamide-12-dicarboxylic acid" and the remainder of the sulfolane is added, and the polycondensation is carried out for 120 min at 250° C. The highly viscous reaction mixture is cooled at 130° C., and diluted with 500 ml dimethylformamide. The product is isolated by adding 1000 ml methanol to the mixture at 60° C. The mixture is suction-filtered, washed with methanol, and then dried at 50°–60° C. under vacuum by means of an oil vacuum pump.

Yield: 32 g.
$M_n$: 35,000 g/mol (determined by GPC).
Color: white.
NMR (in hexafluoroisopropanol): 12-C amide blocks and aromatic amide blocks.

EXAMPLE 11

Starting materials:
16.6 g (0.1 mol) isophthalic acid.
24.83 g (0.1 mol) 4,4'-diaminodiphenyl sulfone.
0.6 g $H_3PO_4$ (85% by weight aqueous solution).
0.46 g 4-dimethylaminopyridine.
60 ml sulfolane.

The procedure is as in Example 4.
Yield: 34.8 g.
J-value: 36 cm$^3$/g (measured as a 0.5 wt.% solution in N-methylpyrrolidone-2, at room temperature).
Color: white.

Comparison Example A (according to Eur. Pat. No. 0 099 997):

Starting materials:
16.60 g (0.1 mol) isophthalic acid.
20.33 g (0.1025 mol) 4,4'-diaminodiphenylmethane.
1.05 g triphenyl phosphite.
60 ml sulfolane.

The polycondensation is carried out in the same manner as in Example 1.
Yield: 31 g.
Polycondensation time: 180 min at 230° C., 120 min at 250° C.
IR spectrum: aromatic polyamide.
J-value: 66 cm$^3$/g (measured as a 0.5 wt. % solution in sulfuric acid, at room temperature).
Color: yellow.

Comparison Example B (according to European Pat. No. 0 099 997):

Starting materials:
16.60 g (0.1 mol) isophthalic acid.
20.33 g (0.103 mol) 4,4'-diaminodiphenyl ether.
0.54 g $H_3PO_2$ (50 wt. % aqueous solution).
60 ml sulfolane.

The polycondensation is carried out in the same manner as in Example 1.
Yield: 31.0 g.
Polycondensation time: 480 min at 230° C.
IR spectrum: aromatic polyamide, with ether groups.
J-value: 35 cm$^3$/g (measured as a 0.5 wt. % solution in N-methylpyrrolidone-2, at room temperature).
Color: grayish blue.

Comparison Example C (according to European Pat. No. 0 099 997):

Starting materials:
16.60 g (0.1 mol) isophthalic acid.
24.83 g (0.1. mol) 4,4'-diaminodiphenyl sulfone.
1.05 g triphenyl phosphite.
60 ml sulfolane.
10 g diphenyl ether.

The polycondensation is carried out in the manner as in Example 1.
Yield: 29 g.
Polycondensation time: 90 min at 230° C., 720 min at 250° C.
J-value: 13 cm$^3$/g (measured as a 0.5 wt. % solution in N-methylpyrrolidone-2, at room temperature).
Color: dark green.

Comparison Example D

Starting materials:
16.60 g (0.1 mol) isophthalic acid.
24.83 g (0.1 mol) 4,4'-diaminodiphenyl sulfone.
1.24 g triphenyl phosphite.
15.20 g quinoline.
60.00 g sulfolane.

The polycondensation is carried out in the same manner as in Example 1, except that the product is isolated by pouring the reaction product into a solvent mixture of methanol and waer in the ratio of 1:1 by volume.
Polycondensation time: 180 min at 230° C., 360 min at 250° C.
J-value: 7 cm$^3$/g (measured as a 0.5 wt. % solution in N-methylpyrrolidone-2, at room temperature).
Color: yellow.

Comparison Example E (according to European Pat. No. 0 099 997; cf. Comparison Example C):

Starting materials:
16.60 g (0.1 mol) isophthalic acid.
24.83 g (0.1 mol) 4,4'-diaminodiphenyl sulfone.
1.05 g triphenyl phosphite.
60 ml sulfolane.
10 ml N-methylpyrrolidone-2 (NMP)

The polycondensation is carried out as in Example 1.
Yield: 31.0 g.
Polycondensation time: 120 min at 230° C., 180 min at 250° C.
J-value: 12 cm$^3$/g (measured as a 0.5 wt. % solution in N-methylpyrrolidone-2, at room temperature).
Color: green.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for preparing an aromatic polyamide, comprising:
   (i) polycondensing at least one aromatic dicarboxylic acid with at least one aromatic diamine, in solution, in the presence of (i) a phosphorous-containing catalyst, and (ii) a 4-dialkylaminopyridine of the formula

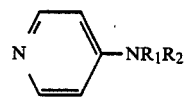

wherein $R_1$ and $R_2$ each, independently, is an alkyl group with 1 to 10 carbon atoms; or $R_1$ and $R_2$ together with the nitrogen atom to which they are both bound form a pyrrolidine or piperidine ring, as a cocatalyst, said polycondensation being run at a temperature above 180° C.; and (ii) isolating at least part of the polyamide obtained.

2. The process of claim 1, wherein the said dicarboxylic acid is at least one compound having the formula

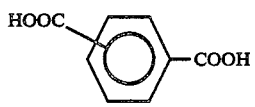

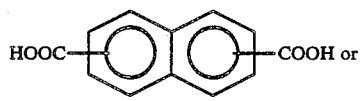

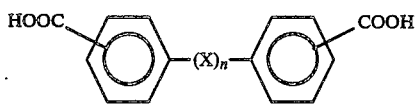

where n is zero or one, and X is —O—, —S—, —CH$_2$—, —CO—, or —SO$_2$—.

3. The process of claim 2, wherein the said aromatic dicarboxylic acid is at least one member selected from the group consisting of terephthalic acid, isophthalic acid, naphthalenedicarboxylic acid, 4,4'-biphenyldicarboxylic acid, 4,4'-diphenyl ether dicarboxylic acid, 4,4'-benzophenonedicarboxylic acid, and 4,4'-diphenyl sulfone dicarboxylic acid.

4. The process of claim 1, wherein the said aromatic diamine is at least one compound of the formula

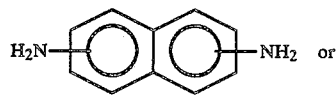

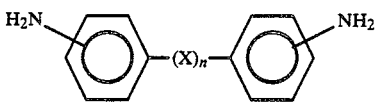

where n is zero or one, and X is —O—, —S—, —CH$_2$—, —CO—, or —SO$_2$—.

5. The process of claim 4, wherein the said aromatic diamine is at least one member selected from the group consisting of p-phenylenediamine, m-phenylenediamine, 4,4'-diaminodiphenylmethane, 4,4'-diaminodiphenyl ether, 4,4'-diaminobiphenyl, 4,4'-diaminodipphenyl sulfide, 4,4'-diaminodiphenyl sulfone, and 3,4'-diaminodiphenyl ether.

6. The process of claim 1, wherein up to 40 mol% of the said aromatic dicarboxylic acid or the said aromatic diamine is replaced with an aliphatic dicarboxylic acid or an aliphatic diamine, respectively.

7. The process of claim 1, wherein the said phosphorus-containing catalyst is a compound of the formula:

$$H_3PO_4, H_3PO_2, P_2O_m, PR_5, PR_3 \text{ or } HPR_2,$$

wherein m is 3 or 5 and R is chlorine, bromine, OH, OAr or OAlk where Ar is a phenyl or a $C_{1\text{-}10}$ alkyl-substituted phenyl group, and Alk is a $C_{1\text{-}10}$ alkyl group.

8. The process of claim 7, comprising using hypophosphorous acid as the said phosphorus-containing catalyst.

9. The process of claim 7, comprising using triphenyl phosphite as the said phosphorus-containing catalyst.

10. The process of claim 1, comprising using 4-dimethylaminopyridine.

11. The process of claim 1, comprising using the said phosphorus-containing catalyst and the said 4-dialkylaminopyridine co-catalyst in an amount of 0.2–10 mol% based on the amount of the said dicarboxylic acid.

12. The process of claim 1, comprising using the said the phosphorus-containing catalyst and the said 4-dialkylaminopyridine co-catalyst in an amount of 1–5 mol% based on the amount of the said dicarboxylic acid.

13. The process of claim 1, comprising carrying-out the said polycondensation in sulfolane or diphenyl sulfone, under an inert gas atmosphere.

* * * * *